(No Model.)

J. M. REDDY.
STEAM WASHER.

No. 380,729. Patented Apr. 10, 1888.

Witnesses:
Albert H. Adams
O. W. Bond

Inventor:
James M. Reddy

UNITED STATES PATENT OFFICE.

JAMES M. REDDY, OF CHICAGO, ILLINOIS.

STEAM-WASHER.

SPECIFICATION forming part of Letters Patent No. 380,729, dated April 10, 1888.

Application filed April 24, 1885. Renewed September 7, 1886. Serial No. 212,937. (No model.)

*To all whom it may concern:*

Be it known that I, JAMES M. REDDY, residing at Chicago, in the county of Cook and State of Illinois, and a citizen of the United States, have invented a new and useful Improvement in Steam-Washers, of which the following is a full description, reference being had to the accompanying drawings, in which—

Figure 1:
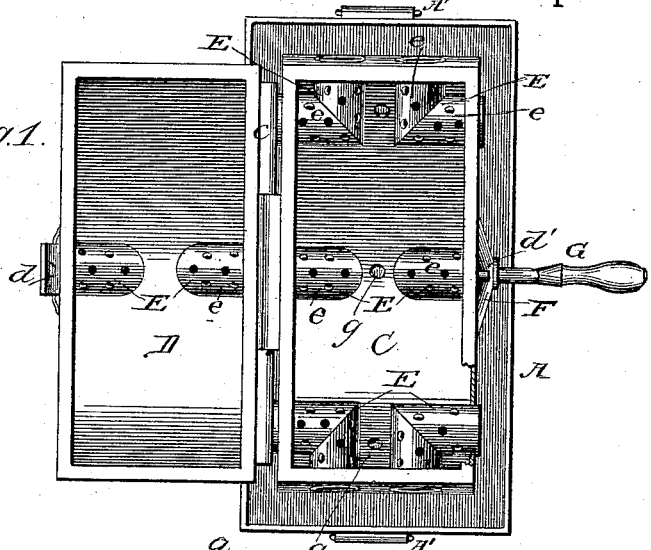
Figure 2:
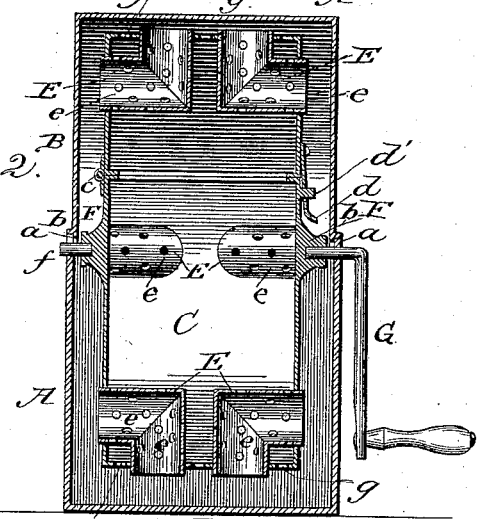
Figure 3:
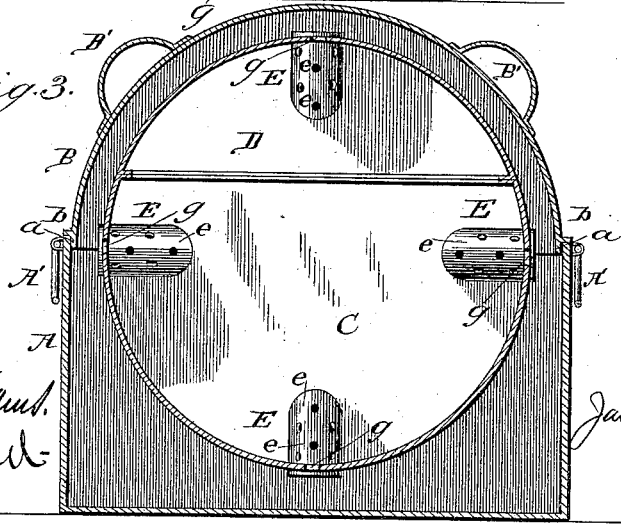

Figure 1 is a top view with the cover of the water-reservoir removed and the cover of the clothes-reservoir open; Fig. 2, a vertical cross-section with both covers closed; Fig. 3, a vertical longitudinal section with both covers closed.

This invention relates to that class of clothes-washers in which the clothes are placed in a receptacle which can be revolved, and into which steam is admitted for the purpose of permeating through the clothes and effectually cleansing them; and it has for its object to improve the construction and operation of the injector by which the steam is admitted to the interior of the receptacle for the clothes, and insure a thorough diffusion of the steam through the receptacle and its contents; and its nature consists in the several parts and combinations of parts hereinafter described, and set forth in the claim as new.

In the drawings, A represents the body or main portion of the water-receptacle, made of sheet-tin, zinc, or other suitable material, and of a rectangular shape, having at each end, as shown, handles A', by which it can be lifted and placed on a stove or other heater.

B is the cover for the receptacle A, also made of sheet-tin, zinc, or other suitable material, and fitting the receptacle A, its bottom edge, *a*, entering within the receptacle, and the cover being supported on the top of the receptacle by a flange, *b*, making a connection between the cover and the receptacle which is practically steam-tight, and, as shown, the cover B has handles B', by which it can be lifted on and off.

C is a cylinder formed of two heads and an encircling band and made of sheet-tin, zinc, or other suitable material, the diameter being less than the length of the body or receptacle A and its width narrower than the width of such receptacle, so that the cylinder lies within the receptacle and cover, with a clear space between the walls of the cylinder and those of the receptacle and cover, and, as shown, the cover has a circular shape longitudinally to correspond to the cylinder. This cylinder in and of itself is not an entirety, but is cut away so as to leave an opening for the insertion of the clothes.

D is a cover for the cylinder C, also made of sheet-tin, zinc, or other suitable material, and having a circle corresponding to that of the cylinder C, so as to form with the cylinder C a complete circle, as shown in Fig. 3. This cover is attached at one side to the cylinder C by hinges *c*, and, as shown, the cover is locked in its closed position by a spring-latch, *d*, which snaps over a pin, *d'*, on the wall of the cylinder C. The abutting edges of the cover and cylinder, as shown, have inwardly-projecting flanges to make a practically tight joint or fit between the cover and the cylinder.

E are elbow-tubes, four for each side of the cylinder C and cover combined, and arranged quartering in the circle of the cylinder and cover, as shown in Fig. 3. Each elbow-tube projects at one end through the side wall of the cylinder or cover, and at the other end projects through the end wall or periphery of the cylinder or cover. As shown, three of the four tubes for each side are located in the body portion of the receptacle for the clothes and one in the cover portion, and each tube has communication by its open ends with the space between the receptacle for the clothes formed by the parts C D and the receptacle formed by the parts A B. Each elbow-tube is provided with a series of holes, *e*, in both of its sections or parts, through which holes steam can pass into the interior of the receptacle C D, and these holes, owing to the circular form of the tube, stand at different radii, so that the steam will be projected in various directions into the receptacle, both endwise and sidewise. The elbow-tubes are arranged in pairs, so as to leave a space between the inner end of each pair, and a space is also left between the tube and the side and end walls of the receptacle, which spaces form passages for the water and steam.

F is a collar or hub, one on each side wall of the receptacle C at the center of the circle of the cylinder, one of the hubs having a spindle, $f$, which rests in a suitable bearing on the side wall of the receptacle A, and the other hub receiving the end of an arm or crank, G, by which the cylinder can be rotated in use.

The periphery or rim of the receptacle C D is provided with a series of holes, $g$, forming a communication between the interior of the receptacle A B and the interior of the receptacle C D, by which water can pass into and out of the receptacle C D from the receptacle A B.

In use the clothes are placed in the receptacle C and the cover D closed down thereon, and water is placed in the receptacle or boiler A, so as to fill the receptacle to a line just below the bottom plane of the side portions of the lowest tubes E when in the position shown in Fig. 2, and the washer placed on a stove or other heater, and the steam produced from the effect of the heat passes through the elbow-tubes E, and by means of the openings or holes $e$ enters the interior of the receptacle C D, and this receptacle is rotated by the arm or crank G, rolling the clothes therein around and bringing different portions thereof for the steam as it enters to act thereon and perform the work of cleansing the articles in the receptacle; and the elbow-tubes through which the steam enters, having both a side and an end delivery by reason of the openings $e$, diffuses the steam on all sides, so as to cause it to act in an effectual and reliable manner in the cleansing process.

What I claim as new, and desire to secure by Letters Patent, is—

The receptacle A B, in combination with the receptacle C D, provided with the elbow-tubes E, having openings $e$, substantially as and for the purpose specified.

JAMES M. REDDY.

Witnesses:
ALBERT H. ADAMS,
O. W. BOND.